(12) United States Patent
Gondek et al.

(10) Patent No.: US 11,504,977 B2
(45) Date of Patent: Nov. 22, 2022

(54) ADJUST SHARPNESS PARAMETERS

(71) Applicant: Hewlett-Packard Development Company, L.P., Spring, TX (US)

(72) Inventors: Jay S Gondek, Vancouver, WA (US); Jason M Quintana, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 51 days.

(21) Appl. No.: 16/981,412

(22) PCT Filed: Apr. 20, 2018

(86) PCT No.: PCT/US2018/028526
§ 371 (c)(1),
(2) Date: Sep. 16, 2020

(87) PCT Pub. No.: WO2019/203846
PCT Pub. Date: Oct. 24, 2019

(65) Prior Publication Data
US 2021/0213755 A1    Jul. 15, 2021

(51) Int. Cl.
*B41J 2/35*  (2006.01)
*B41J 2/355*  (2006.01)

(52) U.S. Cl.
CPC .................. *B41J 2/3555* (2013.01)

(58) Field of Classification Search
CPC ... B41J 2/3555; B41J 2/32; B41J 2/525; B41J 35/16; B41J 35/18; B41J 2002/0052; H04N 1/50; H04N 1/58; B41F 16/00; B41F 16/0006
See application file for complete search history.

(56) References Cited

U.S. PATENT DOCUMENTS

| | | | |
|---|---|---|---|
| 6,351,276 B1 * | 2/2002 | Yamaguchi | B41J 2/36 347/188 |
| 6,704,036 B2 | 3/2004 | Hayashi | |
| 6,825,864 B2 | 11/2004 | Botten et al. | |
| 7,289,134 B2 | 10/2007 | Murayama et al. | |
| 7,310,106 B2 | 12/2007 | Cui | |
| 8,098,269 B2 | 1/2012 | Busch et al. | |
| 9,266,349 B2 | 2/2016 | Nishihara | |
| 9,636,926 B2 | 5/2017 | Aoyagi | |

(Continued)

*Primary Examiner* — Kristal Feggins
(74) *Attorney, Agent, or Firm* — Brooks Cameron & Huebsch PLLC

(57) ABSTRACT

Example implementations relate to adjust sharpness parameters. In some examples, a printing device can include a processing resource and a memory resource storing non-transitory machine-readable instructions to cause the processing resource to receive print data comprising color channels corresponding to print pixels to be formed on a multi-layer thermally activated print medium, determine a characteristic of a corresponding layer of the multi-layer thermally activated print medium for color channels of the received print data, adjust sharpness parameters of the color channels based on the determined characteristic of the corresponding layer of the multi-layer thermally activated print medium, and cause a print head of the printing device to apply thermal energy to an area of the multi-layer thermally activated print medium including the print pixels using the adjusted sharpness parameters.

15 Claims, 3 Drawing Sheets

(56) References Cited

U.S. PATENT DOCUMENTS

| | | |
|---|---|---|
| 2005/0018921 A1 | 1/2005 | Prestia |
| 2007/0086650 A1 | 4/2007 | Li |
| 2010/0085487 A1 | 4/2010 | Sarkar |
| 2013/0021421 A1 | 1/2013 | Ishikawa et al. |
| 2013/0039575 A1 | 2/2013 | Livingston |

* cited by examiner

ADJUST SHARPNESS PARAMETERS

BACKGROUND

An imaging device, such as a printer, may be used to form markings on a physical medium. For example, the printer may receive print data corresponding to text and/or images and may use the received print data to form markings on the physical medium. One technique for forming markings on a medium includes the use of a thermally activated print media, and applying an appropriate amount of thermal energy to desired portions of the thermally activated print media.

DETAILED DESCRIPTION

Figure 1:
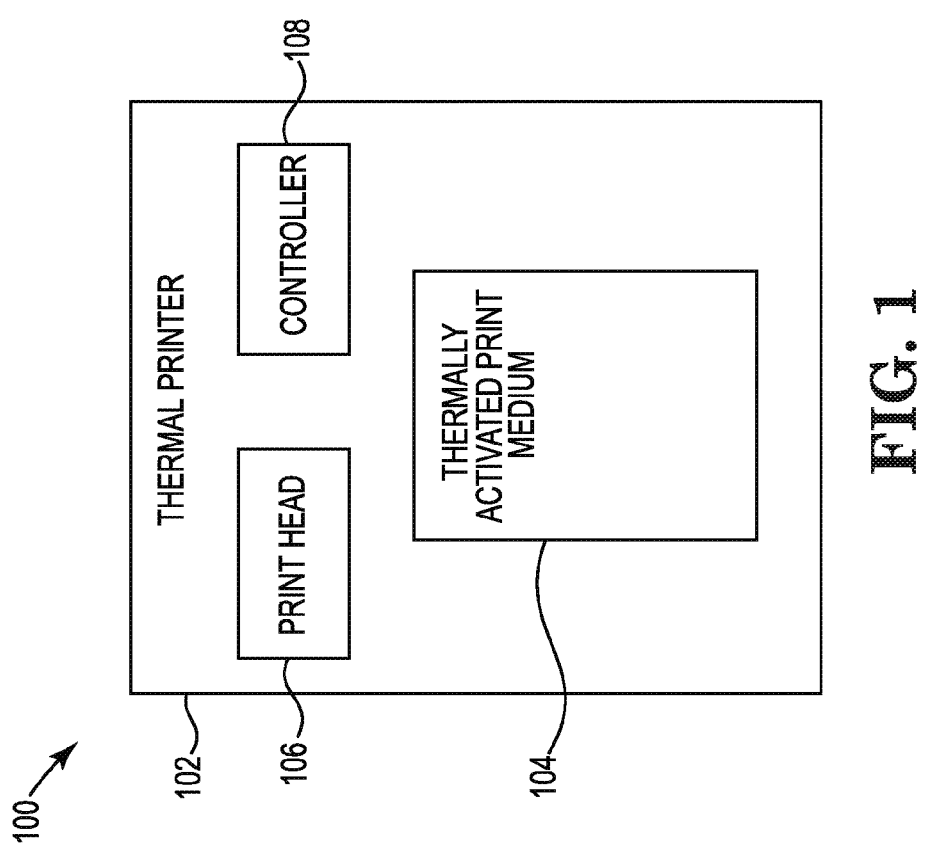
FIG. 1 is a diagram of an example system to adjust sharpness parameters consistent with the disclosure.

Some printers may utilize thermal energy to form markings on a print medium. For example, a thermal printer may form markings on a print medium by applying thermal energy to portions of the print medium. As used herein, the term "thermal printer" refers to any hardware device with functionalities to physically produce representations (e.g., images, text, etc.) of print data on a medium via application of thermal energy to the print medium. In some examples, a "medium" may include a thermally activated print medium.

While a number of print media are contemplated by the present disclosure, one example of print media may include a stack of layers, the layers corresponding to a different color and activating in response to different temperatures, temperature durations, etc. For instance, in one case, a thermal printer can apply heat at various temperatures to a thermally activated print medium to cause different layers of the thermally activated print medium to activate. For example, in one implementation, the thermally activated print medium can include a top yellow layer, a middle magenta layer, and a bottom cyan layer. The thermal printer can apply heat at a first temperature to activate the yellow layer, heat at a second temperature to activate the magenta layer, and heat at a third temperature to activate the cyan layer. For instance, the thermal printer can apply heat at, for example, 100° C. so that the heat penetrates the yellow and magenta layers and activates the cyan layer.

Markings, including text and images, may be formed on a thermally activated print medium in response to reception of print data corresponding to the markings. The print data may comprise signals and/or states corresponding to physical representations (e.g., images, text, etc.) to be formed on a single print medium, or across multiple print media (e.g., pages). The print data, when transmitted to a thermal printer, may be referred to as a print job.

For example, a thermal printer may receive print data corresponding to physical representations such as images, text, etc. (e.g., potentially comprising multiple pages of print media). The thermal printer may use the print data to determine which areas of a thermally activated print medium are to be exposed to thermal energy (e.g., using a thermal print head). In response to exposure to thermal energy, physical representations of the print data (e.g., images, text, etc.) may be formed on the thermally activated print medium.

There may be a desire to adjust print data parameters of the received print data in order to yield physical representations of the print data on the thermally activated print medium that include satisfactory characteristic qualities (e.g., color fidelity, reduction of compression artifacts, reduction of blur, etc.) For example, physical representations corresponding to print data may include undesirable characteristics due at least in part to a particular print media (e.g., a thermally activated print media). In one case, the print data (e.g., corresponding to physical representations of images, text, etc.) may be manipulated prior to printing in order to avoid undesirable characteristics of the resulting physical representations. In one example, it can be possible to adjust the print data by applying a sharpening technique. For example, unsharp masking may be applied to print data to sharpen the resulting physical representation. Other examples of sharpening techniques can include unsharp masking with a Gaussian blur, unsharp masking with a box blur, machine learning, asymmetric weighting, etc.

At times, sharpening techniques may lead to potentially undesirable effects. One such example of an undesirable effect may include over or under sharpening of particular color channels of print data. As used herein, the term "color channel" refers to discrete color-specific portions of print data. For instance, print data representing a greyscale image may comprise one color channel (e.g., black). In another case, print data representing a color image may comprise multiple color channels, such as one portion of print data representing red portions of a color image (e.g., a red channel), one portion of print data representing green portions of a color image (e.g., a green channel), and one portion of print data representing blue portions of a color image (e.g., a blue channel). The different color channels in print data may be combined to form different numbers of possible colors (e.g., a first level of red, a second level of green, a third level of blue).

Although the color channels are described above as including red, green, and blue (RGB) color channels, examples of the disclosure are not so limited. For example, other approaches for dividing color portions of print data into color channels can be used. For example, cyan, magenta, and yellow (CMY) or cyan, magenta, yellow, and black (CMYK) may be used consistent with the claimed subject matter. For instance, print data representing a color image may comprise multiple channels, such as one portion of print data representing yellow portions of a color image (e.g., a yellow channel), one portion of print data representing magenta portions of a color image (e.g., a magenta channel), and one portion of print data representing cyan portions of a color image (e.g., a cyan channel). In some examples, print data representing a color image may comprise multiple channels, including portions representing CMY as described above, as well as one portion of print data representing black portions of a color image (e.g., a black channel). Further, other approaches currently used or to be developed or used in the future may be applied without limitation.

In some examples, application of a sharpening technique may lead to over-sharpening of print data corresponding to a particular color channel (e.g., yellow) corresponding to a top layer of a multi-layer thermally activated print medium may occur, whereas under-sharpening of print data corresponding to a different particular color channel (e.g., cyan) corresponding to a bottom layer of the multi-layer thermally activated print medium may occur. As a result, the physical representation of print data formed on the thermally activated print medium may have over and/or under sharpened color layers.

In at least one case, over and/or under sharpened color layers of a thermally activated print medium may be due to the properties of the print medium. For instance, as thermal energy is applied to the thermally activated print medium, heat can spread across the thermally activated print medium (e.g., activating more than an intended pixel). For example, the thermally activated print medium can be oriented in the thermal printer such that heat can be applied in a vertical direction to allow heat to penetrate vertically through the layers of the thermally activated print medium. However, applied thermal energy can also spread in horizontal directions relative to the vertical direction. Thus, a layer of a thermally activated print medium may exhibit more horizontal spread than a different layer.

Heat spread can cause image blur. Image blur can affect a sharpness of the image. As used herein, the term "sharpness" refers to an acuity between edges of an object in an image. For example, heat spread may cause edges of a portion (e.g., a pixel) of a physical representation of print data on the thermally activated print medium to be blurred, resulting in a loss of sharpness in the portion of the physical representation. As used herein, the term "pixel" refers to a smallest addressable element representing a physical point in an image. The heat spread may further cause color mixtures in other portions (e.g., other pixels, such as neighboring pixels) of the physical representation of the print data on the thermally activated print medium which may be unintended, which may result in different colors than are intended. Further, as a result of the over and/or undersharpening of the color channels, color shifts for finely detailed portions of the physical representation may occur.

Adjust sharpness parameters according to the disclosure can adjust sharpness parameters independently in the various color channels of a physical representation to be printed on a thermally activated print medium based on characteristics of the thermally activated print medium. Adjusting sharpness parameters of the various color channels based on the characteristics of the thermally activated print medium can allow for activation of different layers of the thermally activated print medium at a particular pixel while preventing under or over sharpening of the pixel and/or surrounding pixels. The adjusted sharpness parameters can be used to independently correct for color layer dependent blur on the thermally activated print medium.

FIG. 1 is a diagram of an example system 100 to adjust sharpness parameters consistent with the disclosure. As illustrated in FIG. 1, system 100 can include thermal printer 102. Thermal printer 102 can include print head 106, controller 108, and thermally activated print medium 104.

As illustrated in FIG. 1, thermal printer 102 can include print head 106. As used herein, the term "print head" refers to a component in a thermal printer that causes physical representations, such as text, images, models, etc., to occur on a thermally activated print medium.

For example, print head 106 of thermal printer 102 can utilize heat to cause text, images, etc. to occur on thermally activated print medium 104. Print head 106 can form markings on thermally activated print medium 104 by applying thermal energy (e.g., heat) to portions of thermally activated print medium 104. Collectively, the portions to which thermal printer 102 applies thermal energy on the thermally activated print medium 104 can comprise the physical representation of images, text, etc. to be formed on thermally activated print medium 104.

Thermally activated print medium 104 can include a yellow layer, a magenta layer, and a cyan layer. The layers of thermally activated print medium 104 can be layers including colorless crystals of amorphochromic dyes which can convert to colored form when melted and retain color after re-solidification. In some examples, the top layer of thermally activated print medium 104 can be yellow, the middle layer can be magenta, and the bottom layer can be cyan.

In order to activate various layers of thermally activated print medium 104, print head 106 can apply thermal energy at different temperatures for different time periods. For example, print head 106 can apply a high temperature for a short amount of time to activate the top layer. Print head 106 can apply a low temperature for a long amount of time to activate the bottom layer. Print head 106 can apply a temperature between the high and low temperatures for an amount of time between the short and long amounts of time to activate the middle layer. As used herein, the term "activate" refers to a layer (e.g., a color) of thermally activated print medium 104 developing as a result of the temperature applied to thermally activated print medium 104 by print head 106. Print head 106 can apply thermal energy at different temperatures and for different durations based on characteristics of a particular layer of thermally activated print medium 104, as is further described herein.

As illustrated in FIG. 1, thermal printer 102 can include controller 108. Controller 108 can receive print data about an area to be formed on thermally activated print medium 104. As used herein, the term "print data" refers to information relating to a physical representation to be printed on thermally activated print medium 104. For example, print data can include color values of the physical representation at various locations on thermally activated print medium 104. Controller 108 can receive print data from, for example, a computing device, although examples of the disclosure are not so limited.

For example, controller 108 can receive print data corresponding to a physical representation to be formed on thermally activated print medium 104 of a tree having leaves and a blue sky background. The print data can include values of color, an image resolution, and/or the locations of the different values of color of the physical representation of the tree with the blue sky background on thermally activated print medium 104, among other print data. In some examples, the values of amounts of color can be represented by an 8-bit value.

Although controller 108 is illustrated in FIG. 1 as being included in thermal printer 102, examples of the disclosure are not so limited. For example, controller 108 can be remote from thermal printer 102 and can communicate with thermal printer 102 via a network relationship, such as a wired or wireless network.

Controller 108 can determine, for color channels of the received print data, a characteristic of a corresponding layer of the multi-layer thermally activated print medium 104. As used herein, the term "characteristic of a layer of thermally activated print medium" refers to a physical response of a particular layer of thermally activated print medium when thermal energy is applied to the layer at a particular temperature and/or for a particular duration. For example, the print data received by controller 108 can include a particular amount of color of a particular pixel of thermally activated print medium 104, which may be represented by an 8-bit value. Based on the particular 8-bit value, controller 108 can determine a temperature and a duration of the temperature that print head 106 can apply to the location of the pixel on thermally activated print medium 104 to achieve the color in each color channel. For instance, controller 108 can determine print head 106 can apply a temperature of 100° C. for ten milliseconds to activate the pixel to form the particular 8-bit color value for the pixel on thermally activated print medium 104.

Based on the determined temperature and duration of the application of thermal energy to the pixel, controller 108 can determine a characteristic of a layer of thermally activated print medium 104. For example, controller 108 can determine that, for an application of thermal energy at a temperature of 100° C. for ten milliseconds, blur occurs in the cyan layer of thermally activated print medium 104, but that the yellow layer and magenta layer of thermally activated print medium 104 do not blur. In other words, controller 108 can determine characteristics of each layer of thermally activated print medium 104 based on the received print data.

Although the characteristics of each layer of thermally activated print medium 104 are described above as including a cyan layer having a blur, while the yellow and magenta layers do not, examples of the disclosure are not so limited. For example, different pixels on thermally activated print medium 104 may have different color values and, as a result, may include different temperature and durations of the application of thermal energy to those pixels. Accordingly, the characteristic response of each color layer of thermally activated print medium 104 can be different based on the received print data (e.g., a color value that corresponds to a particular temperature and duration of thermal energy application to thermally activated print medium 104). For example, print data for various pixels may result in a yellow layer blurring more easily than the magenta or cyan layer, the yellow and magenta layers blurring more easily than the cyan layer, the magenta layer blurring more easily than the yellow and cyan layers, etc.

Controller 108 can adjust sharpness parameters of individual color channels. As used herein, the term "sharpness parameters" refers to parameters which may affect the sharpness of the physical representation to be printed on thermally activated print medium 104. The sharpness parameters can be adjusted by controller 108 based on the determined layer characteristic of thermally activated print medium 104, as is further described herein. Sharpness parameters can be adjusted using various sharpening techniques. For example, sharpening techniques can include unsharp masking, including unsharp masking with Gaussian blur, unsharp masking with a box blur, asymmetric weighting, etc.

Continuing with the example above, controller 108 can adjust sharpness parameters of a cyan color channel. Controller 108 can adjust sharpness parameters of the cyan color channel based on the characteristics of the cyan color layer of thermally activated print medium 104. For example, as described above, the cyan layer may blur more readily than the yellow or the magenta layers of thermally activated print medium 104. Controller 104 can, based on the determined blur characteristic of the cyan color layer, apply extra sharpening to the cyan color channel to compensate for the blur characteristic. For instance, controller 108 can sharpen the cyan color channel using an unsharp mask with a Gaussian blur. The unsharp mask with Gaussian blur can apply extra sharpening to the cyan color channel such that, when print head 106 applies thermal energy to a pixel on thermally activated print medium 104, the cyan color layer is not blurred.

Although controller 108 is described above as adjusting sharpness parameters of a cyan color channel based on a characteristic of the cyan layer of thermally activated print medium 104, examples of the disclosure are not so limited. For example, controller 108 can individually adjust the sharpness parameters of the yellow color channel based on a characteristic of the yellow layer of thermally activated print medium 104, and/or individually adjust the sharpness parameters of the magenta color channel based on a characteristic of the magenta layer of thermally activated print medium 104, and/or combinations thereof. Further, controller 108 can adjust sharpness parameters utilizing sharpening techniques besides unsharp masking with Gaussian blur. For example, controller 108 can adjust sharpness parameters utilizing machine learning, asymmetric weighting, unsharp masking with a box blur, among other sharpening techniques.

Controller 108 can adjust sharpness parameters of the yellow color channel, magenta color channel, and/or cyan color channel individually based on determined characteristics of the yellow, magenta, and/or cyan color layers of thermally activated print medium 104. For example, controller 108 can adjust sharpness parameters of the yellow color channel independently of the magenta and/or cyan color channels, the magenta color channel independently of the yellow and/or cyan color channels, and/or the yellow color channel independently of the magenta and cyan color channels based on determined characteristics of the yellow, magenta, and/or cyan color layers of thermally activated print medium 104.

As described above, controller 108 can adjust sharpness parameters of individual color channels based on determined characteristics of the yellow, magenta, and/or cyan color layers of thermally activated print medium 104. Sharpness parameters can include a sharpening radius, a sharpening intensity, and/or a sharpening threshold, among other sharpness parameters.

In some examples, controller 108 can adjust a sharpening radius of a color channel included in the print data. As used herein, the term "sharpening radius" refers to a size of a sharpening area. The sharpening radius can be the same in an X and Y direction. Continuing with the example above, the print data can include an area on thermally activated print medium 104 including a color value, where, based on determined characteristics of a cyan color layer of thermally activated print medium 104, controller 108 can adjust sharpness parameters in the cyan color channel. Controller 108 can adjust the sharpness parameters by adjusting the sharpening radius applied to the cyan color channel for the area on thermally activated print medium 104 including the color value. The sharpening radius can be used to adjust the sharpening intensity of the cyan color channel of the area on thermally activated print medium 104 so that, based on the characteristics of the cyan layer of thermally activated print medium 104, the cyan layer does not blur at the area on thermally activated print medium 104.

In some examples, the sharpening radius can be defined by a pixel size. For example, the size of the sharpening radius can correspond to an amount of pixels the sharpening radius covers. For instance, controller 108 can adjust the sharpening radius to be one pixel. In some examples, controller 108 can adjust the sharpening radius to be greater than one pixel. In some examples, controller 108 can adjust the sharpening radius to be less than one pixel.

In some examples, controller 108 can adjust the sharpening radius such that the sharpening radius can be asymmetrical. For instance, controller 108 can adjust the sharpening radius in an X direction and the sharpening radius in a Y direction such that the sharpening radius can be different in the X direction than in the Y direction. In some examples, the sharpening radius in the X direction can be larger than in the Y direction. In some examples, the sharpening radius in the X direction can be smaller than in the Y direction. Controller 108 can utilize an asymmetrical sharpening radius in an example in which the determined characteristic of the cyan layer includes an asymmetrical blur.

Although controller 108 is described above as adjusting a sharpening radius of a cyan color channel of the print data based on determined characteristics of the cyan color layer of thermally activated print medium 104, examples of the disclosure are not so limited. For example, controller 108 can adjust a sharpening radius of a yellow and/or magenta color channel of the print data based on determined characteristics of the yellow color layer and/or the magenta color layer of thermally activated print medium 104, respectively.

In some examples, controller 108 can adjust a sharpening intensity of a color channel included in the print data. As used herein, the term "sharpening intensity" refers to a strength of the sharpening effect between edges of an object in the physical representation of the print data. For example, the physical representation of the print data formed on thermally activated print medium 104 can include an area on thermally activated print medium 104 including a color value, where, based on determined characteristics of a cyan color layer of thermally activated print medium 104, controller 108 can adjust sharpness parameters in the cyan color channel. Controller 108 can adjust the sharpness parameters by adjusting the sharpening intensity applied to the cyan color channel for the area on thermally activated print medium 104 including the color value.

Although controller 108 is described above as adjusting a sharpening intensity of a cyan color channel of the print data based on determined characteristics of the cyan color layer of thermally activated print medium 104, examples of the disclosure are not so limited. For example, controller 108 can adjust a sharpening intensity of a yellow and/or magenta color channel of the print data based on determined characteristics of the yellow color layer and/or the magenta color layer of thermally activated print medium 104, respectively.

In some examples, controller 108 can adjust a sharpening threshold of a color channel included in the print data. As used herein, the term "sharpening threshold" refers to a threshold at which controller 108 can adjust the sharpening radius and/or the sharpening intensity. The sharpening threshold can be based on a difference between an original pixel and a blurred version of the original pixel. For example, sharpening techniques, such as an unsharp mask, can include blurring the original pixel and subtracting from the original pixel to generate a high-frequency detailed pixel. A difference between the detailed pixel and the blurred pixel can be compared to the sharpening threshold. For instance, if the pixel exceeds the sharpening threshold, the high-frequency detailed pixel can be added back to the original image as a factor of an image intensity. If the pixel does not exceed the sharpening threshold, controller 108 can refrain from sharpening the pixel.

Controller 108 can individually adjust sharpness parameters for three color channels of the color channels based on the determined characteristics of the color layers of thermally activated print medium 104. For example, the color channels can include cyan, magenta, and yellow color channels. Controller 108 can individually adjust sharpness parameters for the yellow color channel, the magenta color channel, and the cyan color channel based on the determined characteristics of the yellow, magenta, and cyan color layers of thermally activated print medium 104. That is, controller 108 can adjust the sharpening radius and/or sharpening intensity of the yellow color channel based on the determined characteristics of the yellow color layer of thermally activated print medium 104, the sharpening radius and/or sharpening intensity of the magenta color channel based on the determined characteristics of the magenta color layer of thermally activated print medium 104, and/or the sharpening radius and/or sharpening intensity of the cyan color channel based on the determined characteristics of the cyan color layer of thermally activated print medium 104, For example, controller 108 can adjust the sharpening radius of the cyan color channel to one pixel and the sharpening intensity of the cyan color channel to 50% based on the determined characteristics of the cyan color layer of thermally activated print medium 104, the sharpening radius of the magenta color channel to two pixels and the sharpening intensity of the magenta color channel to 60% based on the determined characteristics of the magenta color layer of thermally activated print medium 104, and the sharpening radius of the yellow color channel to 0.5 pixels and the sharpening intensity of the yellow color channel to 40% based on the determined characteristics of the yellow color layer of thermally activated print medium 104.

In some examples, each of the three color channels can include different sharpness parameters based on the determined characteristics of the color layers of thermally activated print medium 104. For instance, as in the example described above, controller 108 can adjust the sharpness parameters of the cyan color channel such that the cyan color channel includes a first sharpening radius and/or a first sharpening intensity based on the determined characteristics of the cyan color layer of thermally activated print medium 104, the sharpness parameters of the magenta color channel such that the magenta color channel includes a second sharpening radius and/or a second sharpening intensity based on the determined characteristics of the magenta color layer of thermally activated print medium 104, and the yellow color channel such that the yellow color channel includes a third sharpening radius and/or a third sharpening intensity based on the determined characteristics of the yellow color layer of thermally activated print medium 104. In other words, the sharpness parameters can be different for each color channel, and controller 108 can individually adjust the sharpening radius and/or sharpening intensity of each color channel based on the determined characteristics of the color layers of thermally activated print medium 104.

Although each of the three color channels are described above as including different sharpness parameters, examples of the disclosure are not so limited. For example, two of the color channels may include the same sharpness parameters, while a third color channel may include different sharpness parameters.

Controller 108 can individually adjust the sharpness parameters of each color channel in response to the print data corresponding to each color channel exceeding a particular sharpening threshold of each color channel. For example, controller 108 can adjust the sharpness parameters of the cyan color channel in response to print data of the cyan color channel exceeding a sharpening threshold corresponding to the cyan color channel based on determined characteristics of a cyan color layer of thermally activated print medium 104. Additionally, controller 108 can adjust the sharpness parameters of the magenta color channel in response to print data of the magenta color channel exceeding a sharpening threshold corresponding to the magenta color channel based on determined characteristics of a magenta color layer of thermally activated print medium 104. Further, controller 108 can adjust the sharpness parameters of the yellow color channel in response to print data of the yellow color channel exceeding a sharpening threshold corresponding to the yellow color channel based on determined characteristics of a yellow color layer of thermally activated print medium 104.

In some examples, the area to be printed is a pixel on thermally activated print medium 104. The particular sharpening threshold of each color channel can be based on the sharpness level of the pixel and sharpness levels of neighboring pixels of the pixel based on determined characteristics of color layers of thermally activated print medium 104. For example, the physical representation corresponding to the print data can include a pixel with cyan, magenta, and yellow color channels. The sharpening threshold of the pixel can be based on a sharpness level of the pixel, as well as sharpness levels of neighboring pixels.

In some examples, controller 108 can adjust the sharpening radius of each color channel of the pixel based on a resolution included in the print data. As used herein, the term "resolution" refers to an amount of pixels in an image, or in a particular area of an image.

Controller 108 can adjust the sharpening radius to be larger as the resolution increases. For instance, the physical representation of the print data can include a resolution of 300 pixels per inch, and controller 108 can adjust the sharpening radius to be 1.2 pixels. In an example in which the physical representation of the print data includes a resolution of 400 pixels per inch, controller 108 can adjust the sharpening radius to be 1.6 pixels.

In some examples, controller 108 can individually adjust sharpness parameters for two color channels of the color channels based on the determined characteristics of the corresponding color layers of thermally activated print medium 104. In some examples, controller 108 can individually adjust sharpness parameters for the cyan and magenta color channels based on the determined characteristics of the cyan and magenta color layers of thermally activated print medium 104, while not adjusting sharpness parameters for the yellow color channel. In some examples, controller 108 can individually adjust sharpness parameters for the cyan and yellow color channels based on the determined characteristics of the cyan and yellow color layers of thermally activated print medium 104, while not adjusting sharpness parameters for the magenta color channel. In some examples, controller 108 can individually adjust sharpness parameters for the magenta and yellow color channels based on the determined characteristics of the magenta and yellow color layers of thermally activated print medium 104, while not adjusting sharpness parameters for the cyan color channel. The sharpness parameters of the two color channels that are adjusted based on the determined characteristics of the color layers of thermally activated print medium 104 can be adjusted to be the same sharpness parameters, or can be adjusted to have different sharpness parameters.

In some examples, controller 108 can individually adjust sharpness parameters for one color channel of the color channels based on the determined characteristics of the corresponding color layer of thermally activated print medium 104. In some examples, controller 108 can individually adjust sharpness parameters for the cyan color channel based on the determined characteristics of the corresponding cyan color layer of thermally activated print medium 104, while not adjusting sharpness parameters for the magenta and yellow color channels. In some examples, controller 108 can individually adjust sharpness parameters for the magenta color channel based on the determined characteristics of the corresponding magenta color layer of thermally activated print medium 104, while not adjusting sharpness parameters for the cyan and yellow color channels. In some examples, controller 108 can individually adjust sharpness parameters for the yellow color channel based on the determined characteristics of the corresponding yellow color layer of thermally activated print medium 104, while not adjusting sharpness parameters for the cyan and magenta color channels.

Controller 108 can adjust sharpness parameters of coordinates of the pixel in the individual color channels based on the determined characteristics of the corresponding color layers of thermally activated print medium 104. For example, each pixel can include an X-coordinate and Y-coordinate for the cyan color channel, an X-coordinate and Y-coordinate for the magenta color channel, and an X-coordinate and Y-coordinate for the yellow color channel. Controller 108 can adjust sharpness parameters of the X-coordinate and the Y-coordinate of the cyan color channel based on the determined characteristics of the corresponding cyan color layer of thermally activated print medium 104, the X-coordinate and the Y-coordinate of the magenta color channel based on the determined characteristics of the corresponding magenta color layer of thermally activated print medium 104, and the X-coordinate and the Y-coordinate of the yellow color channel based on the determined characteristics of the corresponding yellow color layer of thermally activated print medium 104. The sharpness parameters for the X-coordinate and Y-coordinate for the cyan color channel can be the same or different, the same or different for the X-coordinate and Y-coordinate for the magenta color channel, and the same or different for the X-coordinate and Y-coordinate for the yellow color channel.

Controller 108 can cause print head 106 of thermal printer 102 to apply thermal energy to the area on thermally activated print medium 104 using the adjusted sharpness parameters. For example, the area to be formed on thermally activated print medium 104 can be a pixel. Print head 106 can apply thermal energy (e.g., heat) to the pixel on thermally activated print medium 104. Print head 106 can cause print head 106 to apply thermal energy to the pixel on thermally activated print medium 104 using the adjusted sharpness parameters by applying a particular temperature for a particular amount of time to thermally activated print medium 104.

Adjust sharpness parameters, according to the disclosure, can allow for thermal printers to adjust sharpness parameters in various color channels independently and individually based on the characteristics of various layers of the thermally activated print medium. Individually adjusting sharpness parameters in the various color channels based on the characteristics of various layers of the thermally activated print medium can prevent a physical representation of print data (e.g., an image or text) from unintended or undesirable effects such as over or under sharpening of particular color layers, unintended colors, etc. In other words, adjusting sharpness parameters based on known characteristics of color layers of a thermally activated print medium can allow for reduced blur and/or unintended color changes when thermal energy is applied to the thermally activated print medium.

Figure 2:
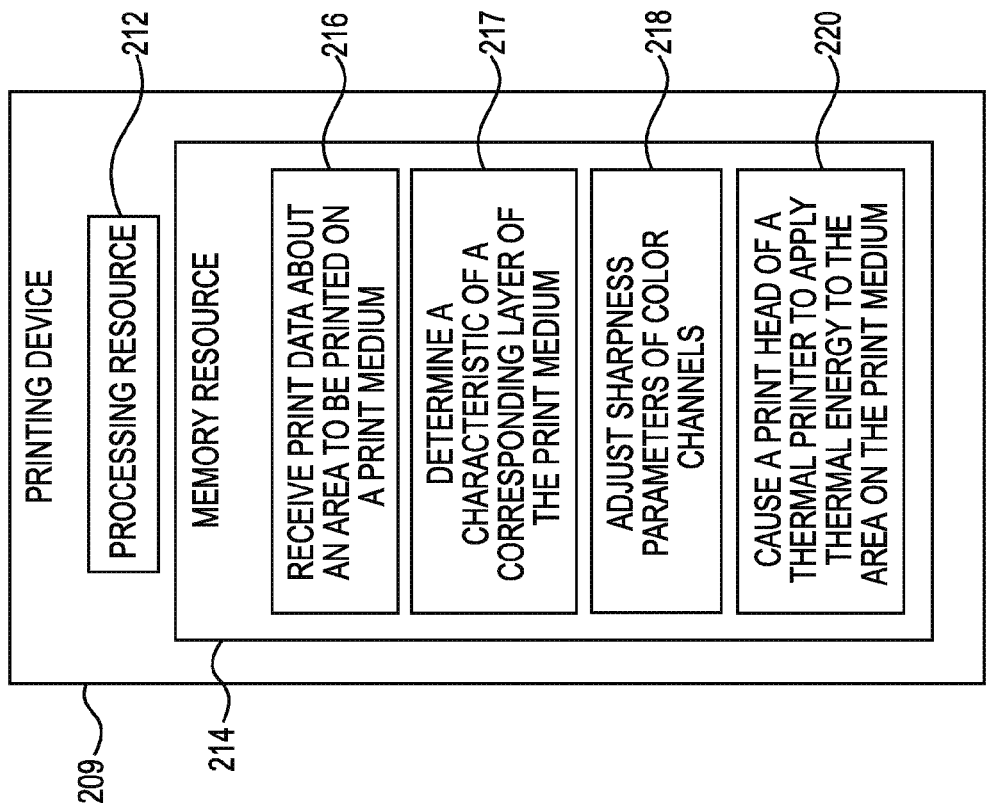
FIG. 2 is a diagram of an example controller to adjust sharpness parameters consistent with the disclosure.

FIG. 2 is a diagram of an example printing device 209 to adjust sharpness parameters consistent with the disclosure. As described herein, the printing device 209 may perform a number of functions related to adjusting sharpness parameters. Although not illustrated in FIG. 2, the printing device 209 may include a processor and a machine-readable storage medium. Although the following descriptions refer to a single processor and a single machine-readable storage medium, the descriptions may also apply to a system with multiple processors and multiple machine-readable storage mediums. In such examples, the printing device 209 may be distributed across multiple machine-readable storage mediums and the printing device 209 may be distributed across multiple processors. Put another way, the instructions executed by the printing device 209 may be stored across multiple machine-readable storage mediums and executed across multiple processors, such as in a distributed or virtual computing environment.

As illustrated in FIG. 2, the printing device 209 may comprise a processing resource 212, and a memory resource 214 storing machine-readable instructions to cause the processing resource 212 to perform a number of operations relating to adjusting sharpness parameters. That is, using the processing resource 212 and the memory resource 214, the printing device 209 may adjust sharpness parameters based on characteristics of layers of a thermally activated print medium, among other operations. Processing resource 212 may be a central processing unit (CPU), microprocessor, and/or other hardware device suitable for retrieval and execution of instructions stored in memory resource 214.

The printing device 209 may include instructions 216 stored in the memory resource 214 and executable by the processing resource 212 to receive print data about an area to be printed on a print medium. The print medium can include a thermally activated print medium. The print data can include values of color, an image resolution, and/or the locations of the different values of color of a physical representation (e.g., text or an image) of the print data, among other print data.

The printing device 209 may include instructions 217 stored in the memory resource 214 and executable by the processing resource 212 to determine a characteristic of a corresponding layer of the print medium, That is, printing device 209 may include instructions 217 stored in the memory resource 214 and executable by the processing resource 212 to determine, for color channels of the received print data, a characteristic of a corresponding layer of the multi-layer thermally activated print medium. For example, printing device 209 can determine that, for an application of thermal energy at a temperature of 100° C. for two seconds on the thermally activated print medium, blur can occur in a cyan layer of the thermally activated print medium having yellow, magenta, and cyan color layers. However, the yellow layer and magenta layers of the thermally activated print medium may not blur. In other words, printing device 209 can determine characteristics of each color layer of the thermally activated print medium based on the received print data.

The printing device 209 may include instructions 218 stored in the memory resource 214 and executable by the processing resource 212 to adjust sharpness parameters of color channels. That is, the printing device 209 may include instructions 218 stored in the memory resource 214 and executable by the processing resource 212 to adjust sharpness parameters of color channels based on the determined characteristic of a corresponding layer of the multi-layer thermally activated print medium. As described above, the color channels can include cyan, magenta, and yellow color channels, Sharpness parameters can include a sharpening radius, a sharpening intensity, and a sharpening threshold, among other sharpness parameters. Printing device 209 can individually adjust a sharpening radius, a sharpening intensity, and/or a sharpening threshold of the yellow color channel based on the determined characteristic of the yellow color layer of the thermally activated print media, a sharpening radius, a sharpening intensity, and/or a sharpening threshold of the magenta color channel based on the determined characteristic of the magenta color layer of the thermally activated print media, and/or a sharpening radius, a sharpening intensity, and/or a sharpening threshold of the cyan color channel based on the determined characteristic of the cyan color layer of the thermally activated print media.

The printing device 209 may include instructions 220 stored in the memory resource 214 and executable by the processing resource 212 to cause a print head of a thermal printer to apply thermal energy to the area on the print medium. That is, the printing device 209 may include instructions 220 stored in the memory resource 214 and executable by the processing resource 212 to cause a print head of a thermal printer to apply thermal energy to the area on the thermally activated print medium using the adjusted sharpness parameters.

Figure 3:
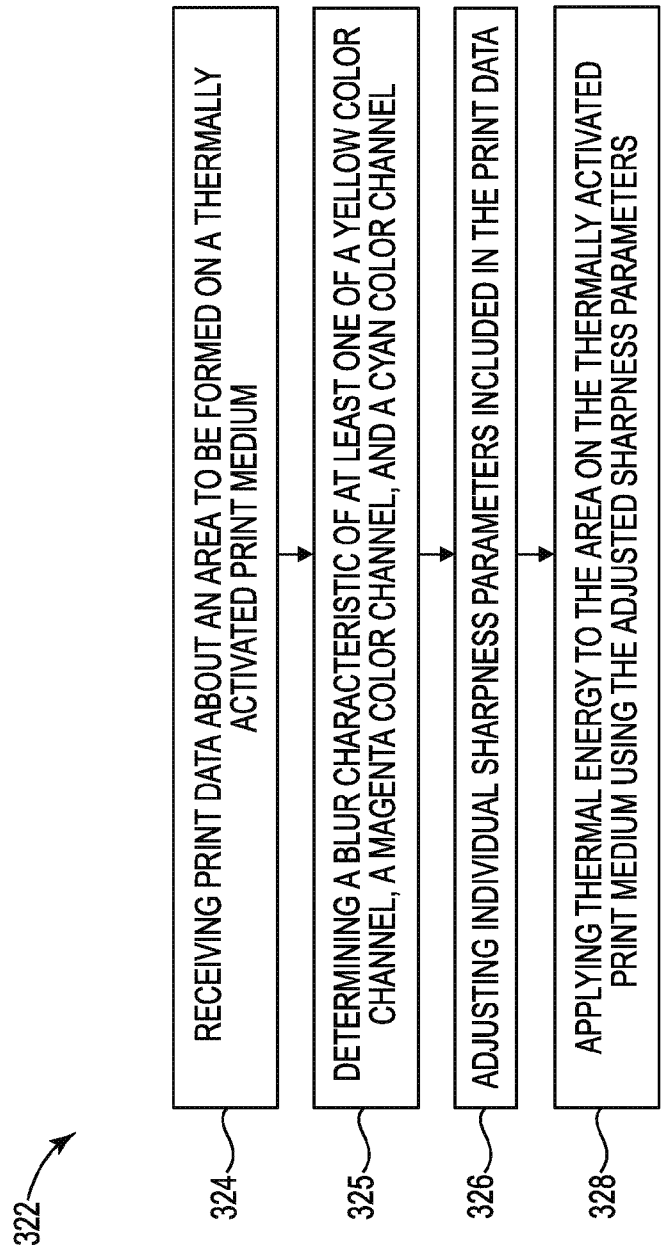
FIG. 3 is an example of a method to adjust sharpness parameters consistent with the disclosure.

FIG. 3 is an example of a method 322 to adjust sharpness parameters consistent with the disclosure. Method 322 may be performed, for example, by a controller (e.g., controller 108, printing device 209, previously described in connection with FIGS. 1 and 2, respectively), and a print head (e.g., print head 106, previously described in connection with FIG. 1) of a thermal printer (e.g., thermal printer 102, previously described in connection with FIG. 1).

At 324, the method 322 may include receiving print data about an area to be printed on a thermally activated print medium. The area on the thermally activated print medium can be formed by a print head of a thermal printer via application of thermal energy to the area by the print head, as is further described herein. The controller can receive print data that can include values of color, an image resolution, and/or the locations of the different values of color of a physical representation (e.g., text or an image) of the print data.

At 325, the method 322 can include determining a blur characteristic of at least one of a yellow color channel, a magenta color channel, and a cyan color channel. The blur characteristic of a particular color channel can correspond to a color layer of the thermally activated print medium. For example, the blur characteristic of the yellow color channel can correspond to a yellow layer of the multi-layer thermally activated print medium, the blur characteristic of the magenta color channel can correspond to a magenta layer of the multi-layer thermally activated print medium, and the blur characteristic of the cyan color channel can correspond to a cyan layer of the multi-layer thermally activated print medium.

For example, the controller can determine that, for an application of thermal energy at a temperature of 100° C. for two seconds on the thermally activated print medium, blur can occur in a cyan layer of the thermally activated print medium. However, the yellow layer and magenta layers of the thermally activated print medium may not blur. In other words, the controller can determine characteristics of each color layer of the thermally activated print medium based on the received print data.

At 326, the method 322 can include adjusting individual sharpness parameters included in the print data. The sharpness parameters of each color channel can be adjusted by the controller based on the blur characteristics of the color layers of the thermally activated print medium. For example, the controller can adjust the sharpness parameters of the yellow color channel based on the blur characteristics of the yellow layer of the thermally activated print medium, the sharpness parameters of the magenta color channel based on the blur characteristics of the magenta layer of the thermally activated print medium, and the sharpness parameters of the cyan color channel based on the blur characteristics of the cyan layer of the thermally activated print medium.

In some examples, the sharpness parameters can include a sharpening radius. The method 322 can include adjusting, by the controller, a sharpening radius of the yellow, magenta, and/or cyan color channels based on the blur characteristics of the yellow, magenta, and/or cyan color layers of the thermally activated print medium.

In some examples, the sharpness parameters can include a sharpening intensity. The method 322 can include adjusting, by the controller, a sharpening intensity of the yellow, magenta, and/or cyan color channels based on the blur characteristics of the yellow, magenta, and/or cyan color layers of the thermally activated print medium.

At 328, the method 322 can include applying thermal energy to the area on the thermally activated print medium using the adjusted sharpness parameters. That is, the controller can cause the print head of the thermal printer to apply thermal energy to the area on the thermally activated print medium using the individually adjusted sharpness parameters of the yellow, the magenta, and the cyan color channels based on the blur characteristics of the yellow, the magenta, and the cyan color layers of the thermally activated print medium.

Method 322 may be repeated. For example, method 322 may be repeated for pixels of the physical representation of the print data that is to be formed on the thermally activated print medium.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

Elements illustrated in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. As used herein, "a plurality of" an element and/or feature can refer to more than one of such elements and/or features.

What is claimed:

1. A thermal printing device comprising:
    a processing resource; and
    a memory resource storing non-transitory machine-readable instructions to cause the processing resource to:
        receive print data comprising color channels corresponding to print pixels to be formed on a multi-layer thermally activated print medium;
        for the color channels of the received print data, determine a temperature and duration of the temperature to be applied to each corresponding layer of the multi-layer thermally activated print medium based on the received print data;
        adjust sharpness parameters of the color channels based on the determined temperature and duration of the temperature to be applied to each corresponding layer of the multi-layer thermally activated print medium; and
        cause a thermal print head of the thermal printing device to apply thermal energy to an area of the multi-layer thermally activated print medium including the print pixels for the temperature and the duration using the adjusted sharpness parameters.

2. The thermal printing device of claim 1, wherein the layers of the multi-layer thermally activated print medium include a yellow layer, a magenta layer, and a cyan layer.

3. The thermal printing device of claim 2, including instructions to determine the temperature and the duration of the temperature of the yellow layer, the magenta layer, and the cyan layer.

4. The thermal printing device of claim 1, including instructions to individually adjust the sharpness parameters for three color channels of the color channels, wherein each of the three color channels include different sharpness parameters.

5. The thermal printing device of claim 1, including instructions to adjust the sharpness parameters of coordinates of the print pixel in the individual color channels.

6. The thermal printing device of claim 1, wherein the sharpness parameters include at least one of a sharpening radius, a sharpening intensity, and a sharpening threshold.

7. A system, comprising:
    a thermal printer including a thermal print head;
    a thermally activated print medium; and
    a controller to:
        receive print data comprising color channels corresponding to print pixels to be formed on a multi-layer thermally activated print medium;
        for color channels of the received print data, determine a temperature and duration of the temperature to be applied to each corresponding layer of the multi-layer thermally activated print medium based on the received print data;
        individually adjust sharpness parameters of the color channels based on the determined temperature and duration of the temperature to be applied to each corresponding layer of the multi-layer thermally activated print medium, wherein the sharpness parameters include at least one of a sharpening radius and a sharpening intensity of each color channel; and
        cause the thermal print head of the thermal printer to apply thermal energy to an area of the multi-layer thermally activated print medium including the print pixels for the temperature and the duration using the adjusted sharpness parameters.

8. The system of claim 7, wherein the controller is further to:
    determine a blur characteristic of each layer of the multi-layer thermally activated print medium; and individually adjust the sharpness parameters of the color channels based on the temperature, the duration of the temperature, and the blur characteristic of each layer of the multi-layer thermally activated print medium.

9. The system of claim 7, wherein the controller adjusts the sharpening radius such that the sharpening radius is asymmetrical.

10. The system of claim 7, wherein the controller individually adjusts the sharpness parameters of each color channel in response to the print data corresponding to each color channel exceeding a particular sharpening threshold of each color channel.

11. The system of claim 10, wherein the particular sharpening threshold of each color channel is based on a sharpness level of the pixel and sharpness levels of neighboring pixels of the pixel.

12. The system of claim 7, wherein the controller adjusts the sharpening radius of each color channel based on a resolution included in the print data.

13. A method, comprising:
receiving, by a controller, print data comprising color channels corresponding to print pixels to be formed on a multi-layer thermally activated print medium by a thermal print head of a thermal printer;
determining, by the controller, a blur characteristic of at least one of:
a yellow color channel corresponding to a yellow layer of the multi-layer thermally activated print medium;
a magenta color channel corresponding to a magenta layer of the multi-layer thermally activated print medium; and
a cyan color channel corresponding to a cyan layer of the multi-layer thermally activated print medium;
determining, by the controller, a temperature and a duration of the temperature to be applied to each of the yellow layer, the magenta layer, and the cyan layer of the multi-layer thermally activated print medium based on the received print data;
adjusting, by the controller, individual sharpness parameters included in the print data of at least one of the yellow color channel, the magenta color channel, and the cyan color channel based on:
the blur characteristics of the yellow layer, the magenta layer, and the cyan layer; and
the determined temperature and duration of the temperature to be applied to each of the yellow layer, the magenta layer, and the cyan layer; and
applying thermal energy, by the thermal print head of the thermal printer, to the area on the thermally activated print medium including the print pixels for the temperature and the duration using the individually adjusted sharpness parameters of the yellow, the magenta, and the cyan color channels.

14. The method of claim 13, wherein the sharpness parameters include a sharpening radius, and wherein the method includes adjusting the sharpening radius of at least one of the yellow, magenta, and cyan color channels.

15. The method of claim 13, wherein the sharpness parameters include a sharpening intensity, and wherein the method includes adjusting the sharpening intensity of at least one of the yellow, magenta, and cyan color channels.

* * * * *